United States Patent [19]

Mitsuyama et al.

[11] 3,787,152
[45] Jan. 22, 1974

[54] OIL SEAL CONSTRUCTION FOR ROTARY INTERNAL COMBUSTION ENGINE

[75] Inventors: Masaru Mitsuyama; Noriyuki Kurio, both of Hiroshima, Japan

[73] Assignee: Toyo Kogyo Co., Ltd., Hiroshima-ken, Japan

[22] Filed: June 7, 1972

[21] Appl. No.: 260,461

[30] Foreign Application Priority Data
June 10, 1971   Japan.............................. 46/49545

[52] U.S. Cl. .............................................. 418/142
[51] Int. Cl...... F01c 19/00, F03c 3/00, F04c 27/00
[58] Field of Search...................... 418/142, 140, 143

[56] References Cited
UNITED STATES PATENTS

| | | | |
|---|---|---|---|
| 3,309,011 | 3/1967 | Osakada et al. ..................... | 418/142 |
| 3,456,624 | 7/1969 | Okamoto ............................. | 418/142 |
| 3,575,541 | 4/1971 | Hamada............................... | 418/142 |
| 3,506,275 | 4/1970 | Moriyama............................ | 418/142 |

*Primary Examiner*—Carlton R. Croyle
*Assistant Examiner*—Louis J. Casaregola

[57] ABSTRACT

An oil seal construction for use in an internal combustion engine of the rotary type, including a generally annular groove formed in each of the side surfaces of an inner body or rotor and having a generally rectangular cross section, an oil seal ring relatively tightly received within the annular groove with a limited clearance inbetween for sealing engagement with the inner surface of each of the side walls of an outer body or engine housing, and biasing means mounted between the annular groove and the oil seal ring for urging the oil seal ring toward each of the outer body side walls to effect the sealing engagement of the oil seal ring. At least one of the side surfaces of the oil seal ring is locally reduced, or more specifically round or tapered, at the bottom corners thereof, so that smoothly sliding engagement of the oil seal ring with the associated inner side surfaces of the annular groove is effected even when the clearance defined between the side walls of the annular groove and of the oil seal ring is so limited as to prevent unnecessary bouncing of the ring, and even when the inner body experiences inevitable rocking motions along the axis of the outer housing.

10 Claims, 4 Drawing Figures

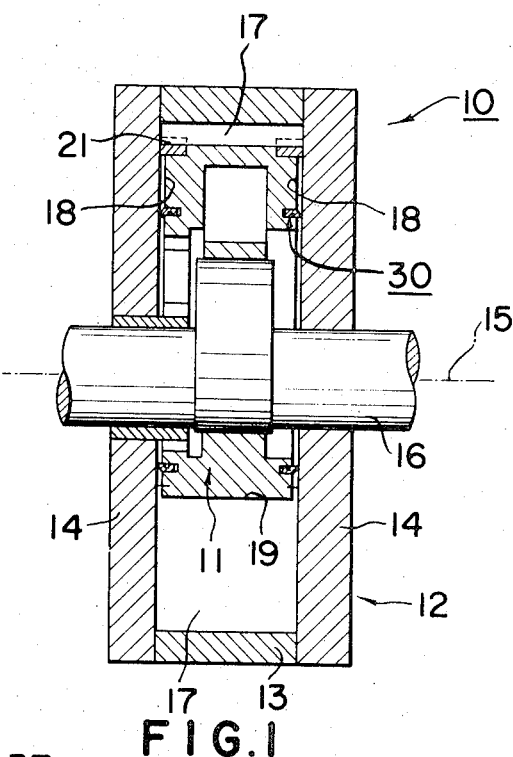
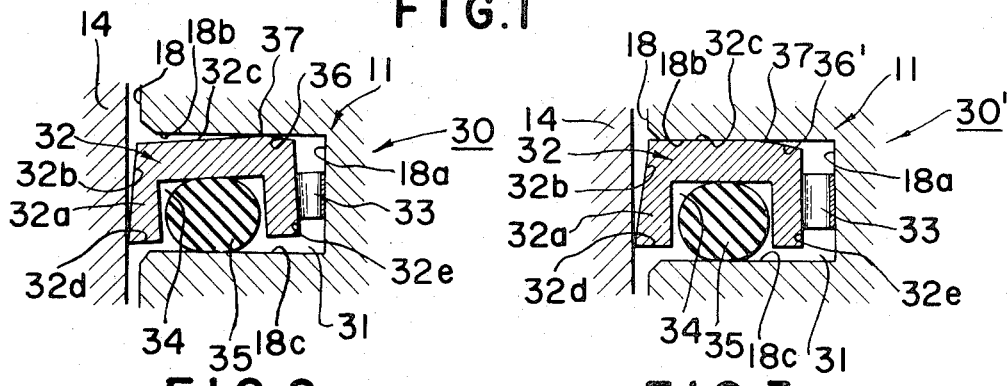
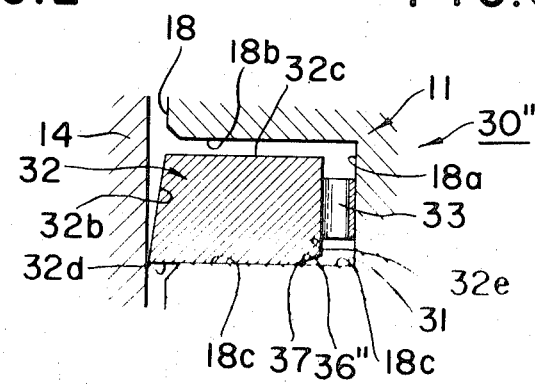

OIL SEAL CONSTRUCTION FOR ROTARY INTERNAL COMBUSTION ENGINE

BACKGROUND OF THE INVENTION

The present invention generally relates to a rotary mechanism, and more particularly to an improved oil seal construction for use in a rotary mechanism, which construction is mounted in the side surfaces of an inner body or rotor of the rotary mechanism for providing effective oil sealing engagement of the inner body with an outer body of the rotary mechanism in the cource of the rotation of the inner body relative to the outer body.

Although the present invention is applicable to and useful in almost any type of rotary mechanism which presents an oil sealing requirement, such as internal combustion engines, fluid motors, fluid pumps, compressors, and the like, it is most particularly useful in rotary internal combustion engines. An internal combustion engine of the rotary type generally includes an outer body or engine housing having spaced side walls and a peripheral wall interconnecting the side walls for defining inbetween a cavity with an axis along which the end walls are spaced from each other. Such a rotary combustion engine also includes an inner body or rotor received within the outer body cavity and supported by the side walls of the outer body for eccentric rotation relative to the axis of the outer body cavity. The inner body or rotor has axially-spaced side surfaces disposed adjacent to the outer body side walls and a peripheral surface with at least three circumferentially-spaced apex portions. These apex portions continuously engage with the outer body peripheral wall, to thereby form a plurality of working chambers which vary in volume during the engine operation as a result of the relative rotation between the inner and outer bodies.

The working chambers thus formed undergo a cyclic operation which includes the four phases of intake, compression, expansion and exhaust. For efficient operation of the engine, the working chambers should be hermetically sealed, and as such an effective gas seal is usually provided between each rotor apex portion and the inner surface of the outer body peripheral wall, as well as between the inner body side surfaces and the inner surfaces of the outer body side walls. As to another sealing factor or oil sealing, a current oil seal construction includes a generally annular groove formed in each of the inner body side surfaces and having a generally rectangular cross section. The oil seal construction also includes an oil seal ring received within the annular groove for sealing engagement with the inner surface of each of the outer body side walls. Suitable biasing means, which is usually a leaf type spring, is also mounted within the annular groove for urging the oil seal ring toward each of the outer body side walls so that the sealing engagement of the oil seal ring is effected.

For accomplishing an efficient engine operation, on the other hand, such rotary combustion engine further includes an intake passage means for admitting an airfuel mixture to the above working chambers, an exhaust passage means communicating with the chambers for discharging therethrough combustion products to the surrounding atmosphere, and suitable ignition means for effecting ignition of the air-fuel mixture under compression.

Insofar as an efficient oil seal is concerned, the internal combustion engine under consideration is subjected to a severe working condition resulting from high and drastic temperature and pressure variations experienced in the working chambers. However, conventional technology in the related art has answered this serious problem as far as the inner body or rotor can rotate within the engine housing with its eccentric axis maintained correctly parallel to the axis of the outer body. This is because smoothly sliding engagement of the oil seal ring with the associated inner side surfaces of the annular groove is ensured with the aid of the biasing force of the leaf spring by securing the above relative arrangement of the inner and outer bodies.

During the engine operation, however, the oil seal ring is exposed to lateral or transverse force owing to the eccentric rotation of the inner body carrying the particular ring. This invites torsion of the oil seal ring which may result in oil leakage the rearound. Due to inevitable production tolerances, on the other hand, the clearance which is formed by or around the bearing means rotatably carrying the inner body may not be uniformly distributed, nor the correct arrangement of the inner and outer bodies with respect to the axes thereof may be of satisfactory quality. As a result, the inner body may rotate within the outer body in a slanting fashion with respect to the axis of the outer body, thus continuing axial rocking motions. These rocking motions will increase an additional oil leakage to the above intrinsic oil leakage coming from the lateral force.

Moreover, the conventional oil seal ring has its bottom or innermost portion formed to have a rectangular shape, and these two rectangular bottom edges are made to be in slidable contact with the inner side surface of the annular groove. When, with this shape, a portion of the oil seal ring is pressed inwardly of the annular groove by the contacting inner surface of the outer body side wall, then one of the edges of the particular portion which is contacting with the inner side wall of the annular groove will partly scratch the contacting inner side wall and will partly be restrained by the contacting wall. As a result, the performance efficiency of the oil seal ring is adversely affected permitting a considerable amount of oil and/or combustion gases to leak thereabout, and at the same time the contacting inner side wall of the annular groove is markedly worn or torn to invite shortened durability of the oil seal construction as a whole.

As has been explained in the above, the determining factors determining the drawbacks concomitant with the conventional oil seal construction for a rotary combustion engine are directed to the rocking motions of the inner body along the axis of the outer body due to the inevitable production tolerances, and also to the bottom portion of the oil seal ring being formed of a rectangular shape. For the former rocking motions, it may be a primafacie satisfactory method to afford a larger width to the annular groove, to thereby provide a larger clearance between the inner side surfaces of the same and the respectively facing surfaces of the oil seal ring, since this large clearance seems to allow the oil seal ring to be moved without trouble by the bias spring within the annular groove, following the cyclic rocking motions. However, the clearance, if it is eccessively large, is found to be accompanied by damage to the side walls of the annular groove due to the bouncing movement of the oil seal ring it may also result in the ring retaining an accumulation or deposit of sludges on the annular groove, breakage of the ring due to compression deformation or distorsion thereof caused by the thermal expansion and the rotation of the rotor itself, and the like. If, on the contrary, the clearance is preset to an ecessively small value, the torsion of the oil seal ring effected by the lateral force will cause be securely retained and the ring to inhibit it from following the rocking motions and to interrupt the so-called end-face sealing contact of the ring with the inner surface of the outer body walls.

SUMMARY OF THE INVENTION

It is, therefore, a primary object of the present invention to provide an improved oil seal construction for use in a rotary mechanism, in which the above drawbacks are precluded.

It is another object of the invention to provide an improved oil seal construction which automatically maintains oil sealing contact between the inner and outer bodies of a rotary mechanism.

A further object is to provide an improved oil seal construction which provides an efficient oil seal between the inner and outer bodies of a rotary mechanism in response to the rocking motions, if any, of the rotor with respect to the axis of the outer body.

In order to achieve the foregoing objects, and in accordance with its purpose, the present invention provides an improved oil seal construction for use in a rotary mechanism, which construction includes a generally annular groove formed in each of the inner body side surfaces and having a generally rectangular cross section, an oil seal ring relatively tightly received within the annular groove with a limited clearance inbetween for sealing engagement with the inner surface of each of the outer body side walls, and bias means mounted between the annular groove and the oil seal ring for urging the oil seal ring toward each of the outer body side walls to effect the sealing engagement of the oil seal ring. In accordance with a prominent aspect of the present invention, since the clearance defined between the side walls of the annular groove and of the oil seal ring is so limited as to prevent unnecessary bouncing of the ring, at least one of the side surfaces of the oil seal ring is locally reduced, or more specifically round or tapered in its cross section, thereby effecting smoothly sliding engagement thereof with the associated inner side surfaces of the annular groove even when the rotor experiences rocking motions along the axis of the outer housing.

BRIEF DESCRIPTION OF THE DRAWING

Other objects and advantages of the present invention will be apparent from the following description taken in conjunction with the accompanying drawing, in which:

FIG. 1 is a longitudinal cross section taken along an axis of an outer body of an internal combustion engine of the rotary type, and incorporates thereinto an improved oil seal construction implementing the present invention;

FIG. 2 is a cross section taken along the axis of an outer body of a rotary combustion engine and shows in an enlarged scale an improved oil seal construction according to the present invention; and FIGS. 3 and 4 are similar to FIG. 2 but respectively show another embodiment of the oil seal construction.

DESCRIPTION OF THE PREFERRED EMBODIMENTS

Referring now to FIG. 1, an internal combustion engine of the rotary type, as generally indicated at numeral 10, generally includes an inner body or rotor 11 and an outer body or engine housing 12. This outer body 12 is provided with a peripheral wall 13 having a curved inner surface which may be basically of the form of an epitrochoid in geometric shape and may include two arched lobe-defining portions or lobes. Two spaced side walls 14 are also provided in the outer body 12 and are innerconnected by the peripheral wall 13. The rotor 11, which may be generally triangular, rotates on an axis 15 of the curved inner surface of the engine housing 12. The side walls 14 support a shaft 16, the geometric center of which is coincident with the axis 15 of the engine housing 12. The side walls 14 together with the peripheral wall 13 of the engine housing 12 thus define a cavity 17, within which the rotor 11 is received for eccentric rotation relative to the axis 15 of the shaft 16. The rotor 11 is provided with side surfaces 18 adjacent to the side walls 14 of the engine housing and with a peripheral surface 19 cooperative with the peripheral wall 13 for forming inbetween a plurality of working chambers 17 in the course of relative and eccentric rotation of the rotor 11.

For illustrative purposes only, a suitable gas seal construction 21 is mounted in a corner portion of the rotor 11, but it should be understood that other gas seal constructions such as an apex seal or side seal may usually be provided even though not shown. An improved oil seal construction 30 according to the invention is shown to be mounted on the side surface 18 of the rotor 11, and will be described hereinafter with reference to FIGS. 2 to 4.

Turning now to FIG. 2, the oil seal construction 30 generally includes a generally annular groove 31 formed in each of the inner body side surfaces 18 and having a generally rectangular cross section taken along the axial direction of the outer body 14, as shown. It should be noted here that an improved oil seal ring 32 is relatively tightly received within the annular groove 31 with a limited clearance inbetween. In this embodiment, the oil seal ring 32 has a shape generally of a capital letter U in its cross section, as shown. Thus, the oil seal ring 32 is provided with an outermost or lip portion 32a having an outer surface 32b sealingly engaged with the outer body side wall 14. The oil seal ring 32 is also provided with side surfaces 32c and 32d and with an inner surface 32e. Between the innermost surface 32e and the bottom surface 18a of the inner body side surface 18 is mounted suitable biasing means 33 for urging the oil seal ring 32 toward the outer body side wall 14 to thereby effect the sealing engagement of the outer surface 32b with the side wall 14. Within a recessed space 34 defined by the U-shaped oil seal ring 32 is received another biasing means or 0 ring 35 which serves to urge upwardly of the drawing, in which side the clearance between the side surface 18b of the annular groove 31 and the side surface 32c of the ring 32 is smaller than the other clearance between the other side surfaces 18c and 32d.

In accordance with the present invention, a locally reduced portion 36 is formed in at least one of the side surfaces 32c and 32d of the oil seal ring 32. It should also be noted here that the reduced portion 36 be located at least at the side in which the above clearance is smaller. For this reason, the reduced portion 36 is, in this instance, located at the opposite side of the 0 ring 35 with respect to the oil seal ring 32. As shown, the reduced portion 36 may be of any shape if it can afford smoothly sliding engagement of the ring 32 as a whole with the associated inner side surface 18a or 18b of the annular groove 31. In this embodiment, the reduced portion 36 is shown to have a shape of a linearly slanting line in its cross section or of a tapered surface disposed at a position adjacent to the bottom surface 18a of the annular groove 31. Thus, it should be appreciated that the contact, as indicated at numeral 37, between the side surfaces 18b, 32c of the annular groove 31 and the oil seal ring 32 is not performed by the surface contact but the quasi-line contact, with the resultant smoothly sliding engagement inbetween.

It is also preferred that the outermost surface 32b of the oil seal ring be oblique or slanting downhill with respect to the outer body side wall 14. This contour is easily reflected by the fact that the outermost surface 32b promotes increased scraping— or sweeping—off of an oil layer which might otherwise be adhered to the inner surface of the outer body side wall 14.

The biasing means 33 may be a corrugated leaf spring of ring shape which is interposed between the bottom surface 18a of the annular groove 31 and the innermost surface 32e of the oil seal ring 32. This bias means 33 may be made of some suitable metal material. On the other hand, the other bias means or 0 ring 35, which may be made of a resilient material such as an oil-resistant rubber, also serves to prevent leakage of oil or combustion gases between the larger clearance defined by the side surfaces 32d and 18c of the oil seal ring 32 and the annular groove 31.

Now, let it be assumed that the upper side of FIG. 2 corresponds to the radial outside of the axis 15 of the outer body side walls 14, as illustrated in FIG. 1. Then, the locally reduced portion 36 and accordingly the contact between the oil seal ring 32 and the side surface of the annular groove 31 is located radially outside of the axis of the outer body 12, and as such this arrangement may be called as an "outer-guide construction." Likewise, the arrangement having the contact surface inversely located may be named an "inner-guide construction."

In a preferable modification of the present invention, one pair of the above outer— and inner-guide constructions may be mounted in the same side surface 18 of the rotor 11 concentrically of each other. With this "dual arrangement", a more efficient oil sealing effect is obtained, in which the slanting directions of the outermost surfaces 32b of the two oil seal rings 32 should be different, namely, in a plane symmetry.

Turning now to FIG. 3, another oil seal construction 30' is shown, in which the difference from the embodiment of FIG. 2 is that the locally reduced portion 36 has a round or arcuate shape. In addition, like numerals indicate counterparts as shown in FIG. 2, so that more detailed explanation of this embodiment will be omitted.

A further embodiment of the invention will be described with reference to FIG. 4, in which like numerals also designate counterparts as shown in FIGS. 2 and 3. It will be easily understood that major differences from the previous embodiments reside in the lack of lateral biasing means or an 0 ring and in the generally rectangular cross section of the oil seal ring 32. For illustrative purposes, on the other hand, the locally reduced portion 36" is formed in the ring 32 radially inside of the axis 15 of the outer body 12, so that this arrangement is called the "inner-guide construction" in accordance with the previous discussion. In this manner, the quasi-line contact 37 between the side surfaces of the annular groove 31 and the oil seal ring 32 is located radially inside of the axis of the outer body 12. It will also be easily understood that the shape of the reduced portion 36" may be linearly slanting, round or arcuate.

In a modification regarding this embodiment of FIG. 4, the reduced portion may be formed in both of the side surfaces 32c and 32d of the ring 32, although not shown. This modification may be called as "two-side-guide construction" in accordance with the previous naming. A further description as the operation of this modification seems self-explanatory, and as such will be omitted.

As has been described hereinbefore, the present invention provides a novel and improved oil seal construction for use in a rotary combustion engine, in which the clearance defined between the side walls of the annular groove and of the oil seal ring is so limited as to prevent unnecessary bouncing of the oil seal ring, and in which at least one of the side surfaces of the oil seal ring is locally reduced, or more specifically curved or tapered, at the bottom corners thereof. With these construction arrangements, smoothly sliding engagement of the oil seal ring with the associated inner side surfaces of the annular groove is effected at the quasi-line contact inbetween even when the inner body experiences the inevitable rocking motions along the axis of the outer housing. The difficulty associated with the oil seal ring being dragged by sludges, including the unburned content in an air-fuel mixture which has been adhered to or deposited on the side walls of the annular groove is eliminated. As a result, the leakage of oil and/or combustion gases between the outermost surface of the oil seal ring and the associated side wall of the outer body is materially reduced to improve economy in oil consumption and output performance of the engine.

What is claimed is:

1. A rotary mechanism comprising:
    an outer body having spaced side walls and a peripheral wall interconnecting said side walls for defining inbetween a cavity having an axis along which said side walls are spaced from each other;
    an inner body received within said outer body cavity and supported by said outer body for eccentric rotation relative to the axis of said outer body cavity, said inner body having side surfaces adjacent to said outer body side walls and a peripheral surface cooperating with said outer body peripheral wall for forming inbetween a plurality of working chambers in the course of the relative rotation of said inner body, and
    an oil seal construction including,
    a generally annular groove formed in each of said inner body side surfaces and having a generally rectangular cross section,
    an oil seal ring relatively tightly received within said annular groove with a limited clearance inbetween for sealing engagement with the inner surface of each of said outer body side walls, and biasing means mounted between said annular groove and said oil seal ring for urging said oil seal ring toward said each of the outer body side walls to effect the sealing engagement of said oil seal ring, the improvement comprising said oil seal ring having at least the side surface thereof adjacent to the bottom of said annular groove locally reduced for effecting smoothly sliding engagement with the associated inner side surfaces of said annular groove responsive to any axial rocking motions of said inner body along the axis of said outer body cavity to insure effective sealing engagement of said oil seal ring with said outer body side walls.

2. A rotary mechanism according to claim 1, wherein the locally reduced portion of the side surfaces of said oil seal ring has a shape of an arc in its cross section.

3. A rotary mechanism according to claim 1, wherein the locally reduced portion of the side surfaces of said oil seal ring has a shape of a linearly slanting line in its cross section.

4. A rotary mechanism according to claim 1, wherein the locally reduced portion of the side surface of said oil seal ring is disposed at the side in which the clearance between one pair of the side surfaces of said oil seal ring and annular groove is smaller than the clearance defined by the other pair of side surfaces.

5. A rotary mechanism according to claim 4, further comprising second biasing means mounted between the other pair of the side surfaces of said oil seal ring and annular groove for urging said oil seal ring toward the side in which said one pair is disposed.

6. A rotary mechanism according to claim 5, wherein said oil seal ring has a shape generally of a capital letter U in its cross section, and the second-named bias means includes an 0 ring received within the U-shaped groove formed in said oil seal ring.

7. A rotary mechanism according to claim 4, wherein the side in which said one pair is disposed is located radially outside of the axis of said outer body cavity.

8. A rotary mechanism according to claim 4, wherein the side in which said one pair is disposed is located radially inside of the axis of said outer body cavity.

9. A rotary mechanism according to claim 1, wherein the outermost surface of said oil seal ring is slanting downhill in its cross section with respect to the associated outer body side wall.

10. A rotary mechanism according to claim 1, wherein the first-named bias means includes a corrugated leaf spring of ring shape interposed between the bottom surface of said annular groove and the innermost surface of said oil seal ring.

* * * * *